United States Patent [19]
Grüne et al.

[11] Patent Number: 4,778,045
[45] Date of Patent: Oct. 18, 1988

[54] APPARATUS FOR TRANSPORTING RECEPTACLES IN FILLING MACHINES

[75] Inventors: Helmut Grüne; Wolfgang Nienstedt, both of Schwarmstedt, Fed. Rep. of Germany

[73] Assignee: Lieder-Mashinenbau GmbH & Co. KG, Schwarmstedt, Fed. Rep. of Germany

[21] Appl. No.: 767,410

[22] Filed: Aug. 20, 1985

[30] Foreign Application Priority Data

Aug. 24, 1984 [DE] Fed. Rep. of Germany ....... 3431174
May 15, 1985 [EP] European Pat. Off. ......... 85105965.9

[51] Int. Cl.⁴ .................................................. B65G 29/00
[52] U.S. Cl. ........................... 198/803.01; 198/803.14
[58] Field of Search ............ 198/803.01, 803.2, 473.1, 198/465.1, 465.3, 465.4, 485.1, 803.14, 803.15; 403/328, 406.1

[56] References Cited

U.S. PATENT DOCUMENTS

| | | | |
|---|---|---|---|
| 2,522,912 | 9/1950 | Weiss | 198/803.01 |
| 2,851,295 | 9/1958 | Chaffee | 403/328 |
| 2,859,713 | 11/1958 | Noel | 198/424 X |
| 3,004,651 | 10/1961 | Manspeaker et al. | 198/803.14 X |
| 3,015,287 | 1/1962 | Noel | 198/803.01 |
| 3,150,765 | 9/1964 | Ellis | 198/803.01 |
| 3,342,304 | 9/1967 | Greulich | 198/802 |
| 3,538,997 | 11/1970 | Christine et al. | 198/803.01 |
| 3,587,829 | 6/1971 | Sorensen | 198/803.01 |
| 3,707,303 | 12/1972 | Petri | 403/328 |
| 4,075,086 | 2/1978 | Marsh, III et al. | 198/473.1 |
| 4,227,594 | 10/1980 | Kluger | 403/406.1 |
| 4,560,139 | 12/1985 | Dahlke | 198/803.14 X |
| 4,684,012 | 8/1987 | Feddersen | 198/803.01 |

Primary Examiner—Robert J. Spar
Assistant Examiner—Cheryl C. Gastineau
Attorney, Agent, or Firm—Peter K. Kontler

[57] ABSTRACT

An apparatus for transporting receptacles or the like in a filling and/or sealing machine has one or more endless conveyors or a turntable and several sets of locating members for individual receptacles or groups of receptacles. The selected locating member are separably coupled to the turntable or to discrete supporting plates on the conveyor or conveyors so that their sockets can accept individual receptacles for transport past one or more filling and/or other stations. If the machine is to treat differently dimensioned and/or configured receptacles, the previously used locating members are replaced with a different set of locating members having sockets which can properly receive the newly selected receptacles for transport past one or more stations. Each locating member can be in a mere linear or in full surface-to-surface contact with the corresponding receptacle or receptacles. The selected locating members can be affixed to the upper side or underside of the turntable or to the upper sides or undersides of discrete supporting plates.

11 Claims, 4 Drawing Sheets

APPARATUS FOR TRANSPORTING RECEPTACLES IN FILLING MACHINES

BACKGROUND OF THE INVENTION

The present invention relates to sealing and/or filling machines in general, and more particularly to improvements in apparatus for transporting receptacles (such as cups, boxes, jars, bottles and/or others) in a receptacle sealing and/or filling machine. Still more particularly, the invention relates to improvements in transporting apparatus which can be utilized in sealing and/or filling machines to advance a succession of receptacles along a predetermined path including one or more filling stations and, if necessary, one or more sealing, closing or capping stations.

It is well known to transport a succession of empty, partly filled and completely filled receptacles on one or more conveyors along a predetermined path wherein the receptacles are partially or completely filled and, if necessary, thereupon sealed or closed prior to removal from the predetermined path. As a rule, each receptacle is placed onto a plate-like support with which it advances at a level below the filling and, if necessary, below the sealing or closing station. A drawback of such transporting apparatus is that each support can only carry or accommodate receptacles of a predetermined size and/or shape. In other words, whenever the filling machine is to receive receptacles of a different size and/or shape, the supports for such receptacles must be replaced with differently configured and/or dimensioned supports. In many instances, the supports are mounted on one or more endless chains or other types of endless conveyors. This presents problems when the machine is to be converted for the treatment of differently dimensioned and/or configured receptacles. Thus, all of the supports must be detached from the conveyor or conveyors to be replaced with a different set of supports having sockets, apertures or otherwise configured means for receiving and supporting portions of or entire receptacles. In other words, each change in setup involves a lengthy and costly interruption of utilization of the machine.

OBJECTS AND SUMMARY OF THE INVENTION

An object of the present invention is to provide a novel and improved apparatus for selectively transporting differently configured and/or dimensioned receptacles in a sealing and/or filling machine.

Another object of the invention is to provide the transporting apparatus with novel and improved means for supporting and locating differently configured and/or dimensioned receptacles during transport past one or more sealing and/or filling stations.

A further object of the invention is to provide a novel and improved sealing and/or filling machine which employs the above-outlined transporting apparatus.

An additional object of the invention is to provide the transporting apparatus with novel and improved means for locating different types of receptacles during transport along a predetermined path which extends along at least one sealing station, along one or more filling stations and/or along one or more other treating stations.

Still another object of the invention is to provide the apparatus with novel and improved means for supporting the locating means for receptacles.

A further object of the invention is to provide the apparatus with novel and improved means for coupling its constituents to each other.

An additional object of the invention is to provide the apparatus with novel and improved means for centering the receptacle-locating means on the conveyor or conveyors.

Another object of the invention is to provide a novel and improved method of supporting, locating and/or orienting differently dimensioned and/or configured receptacles, particularly during transport in a sealing and/or filling machine.

The invention is embodied in an apparatus for transporting different types of receptacles in a sealing and/or filling machine. The apparatus comprises a transporting unit which defines a predetermined path (at least a portion of such path is or can be at least substantially horizontal), and a second unit including several receptacle-locating members, at least one for each type of receptacles. The transporting unit comprises means for supporting a selected locating member or a set of selected locating members so that receptacles of the corresponding type (namely receptacles which fit into or which can be properly located by the selected locating member or members) can be inserted into the selected locating member or members on the transporting unit and can be advanced along the predetermined path. Each locating member is preferably provided with at least one socket having an outline which is complementary to the outlines of receptacles of the corresponding type so that at least a portion of a receptacle can be inserted into the socket when the corresponding locating member is mounted on or in the transporting unit.

In accordance with a presently preferred embodiment of the invention, the supporting means comprises at least one first substantially plate-like component and each locating member comprises at least one second substantially plate-like component. The second component is or can be parallel to and is adjacent to the first component when the two components are (preferably separably) secured to each other. The means for separably securing one or more second components to one or more first components can comprise one or more quick-release couplings so that the attachment of a locating member to, or its detachment from, the supporting means takes up a short interval of time. The supporting means can be provided with a substantially plane upper side and the selected locating member or members rest, or can be caused to rest, on the upper side of the supporting means when the selected locating member or members are in actual use, i.e., when such selected locating member or members are separably coupled to the supporting means. Alternatively, the arrangement can be such that each selected locating member is adjacent to the underside of the supporting means.

The supporting means is preferably formed with at least one aperture which is in register with the socket of the selected locating member and whose configuration is such that it can accommodate a portion of a receptacle which is received in the socket of the selected locating member, irrespective of the type of receptacle. In other words, the cross-sectional area of the aperture in the supporting means at least matches the cross-sectional area of the socket in that locating member which is designed to receive and locate or orient the largest receptacle to be treated in the machine. Furthermore, the configuration of the aperture or apertures in the supporting means is such that the aperture or apertures can receive portions of receptacles irrespective of the configuration of those portions of the receptacles which are intended to enter the aperture or apertures of the supporting means. As a rule, the second unit will comprise several sets of locating members, namely one set for each type of receptacles. In such apparatus, the supporting means is arranged to support a set of selected locating members and has at least one discrete aperture for each locating member of the selected set. Each aperture is in register with the socket of one locating member of the selected set. The number of apertures in the supporting means can match, but it can also exceed, the number of locating members in any one of the sets.

The apparatus can be constructed in such a way that the supporting means need not be provided with one or more apertures for reception of portions of receptacles. Instead, the supporting means can be provided with a surface, such as the top surface of a plate-like supporting means, which abuts against and supports from below that receptacle which is received in the socket of the selected locating member, or those receptacles which are received in the sockets of the selected locating members, for the transport of receptacles toward, past and beyond one or more sealing stations and/or one or more filling stations.

In accordance with a presently preferred embodiment of the invention, the coupling between the supporting means and a selected locating member can comprise a projection (such as an elongated stud or pin) which is provided on the supporting means and is receivable in a complementary opening (such as a cylindrical bore) of the selected locating member. The coupling further comprises detent means for releasably holding the projection in the opening of the selected locating member. The projection can be provided with a transversely extending recess (such as a blind bore which is machined into the peripheral surface and extends at right angles to the axis of a cylindrical stud or pin) and the detent means can comprise a substantially spherical detent element which is received in the recess and means for biasing the detent element outwardly so that the detent element normally extends beyond the outline of the projection and can engage the locating member whose opening receives the projection. The biasing means can comprise a substantially block-shaped part which is made of an elastomeric material. Such block-shaped part can be disposed in the recess inwardly of the detent element. The open end of the recess is preferably surrounded by an annular internal surface of the projection. Such internal surface has a diameter which is preferably slightly less than the diameter of the detent element so that the latter cannot be fully expelled from the recess. The projection is or can be separable from the supporting means, and the apparatus then further comprises means (such as a screw or a bolt and a nut) for separably securing the projection to the supporting means.

The apparatus can further comprise at least one centering device which is provided on the supporting means and engages with the selected locating member. If the apparatus is designed to simultaneously employ a full set of selected locating members, the supporting means is provided with a corresponding number of centering means. The number of centering devices can exceed the overall number of locating members in a selected set. Each centering device can comprise a protuberance (such as a cylindrical stud) which is provided on the supporting means and extends into a complementary hole in the selected locating member.

It is also possible to employ a coupling which comprises a tongue on the supporting means and a complementary groove (such as a dovetailed groove) in the selected locating member. It is further possible to reverse the locations of the tongue and groove, i.e., the tongue can be provided on the selected locating member. Other types of couplings can be used with similar or equal advantage.

The transporting unit can further comprise at least one endless conveyor (e.g., two endless chain conveyors) and means for attaching the supporting means to the conveyor or conveyors. For example, the supporting means can comprise a full battery of discrete plate-like supporting components which are equidistant from each other and are separably secured to two endless chains. The conveyor preferably includes an elongated reach and the supporting means is located at a level above such reach when it advances along a predetermined portion of the predetermined path, namely along that portion of the path in which the receptacles are located during sealing and/or filling. Such apparatus can further comprise means for filling the receptacle or receptacles in the selected locating member or members, and the filling means is preferably disposed at a level above the elongated reach or reaches of the conveyor or conveyors.

Alternatively, the supporting means can constitute a conveyor. Such supporting means can comprise a turntable which is indexible or rotatable about a substantially vertical axis. The selected locating member or members are preferably disposed on the turntable, and the apparatus then preferably further comprises receptacle filling means mounted at a level above the turntable and above the selected locating member or members thereon. If the second unit comprises a full set of locating members for each type of receptacles, the turntable includes means for separably coupling thereto a full set of selected locating members at uniform distances from the axis of the turntable as well as at equal distances from each other, as considered in the circumferential direction of the turntable.

The quick-release coupling for a single locating member or for a full set of locating members can comprise the surfaces bounding the aperture in the supporting means, e.g., in the aforementioned turntable. Each locating member can constitute an insert which is receivable in an aperture of the supporting means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
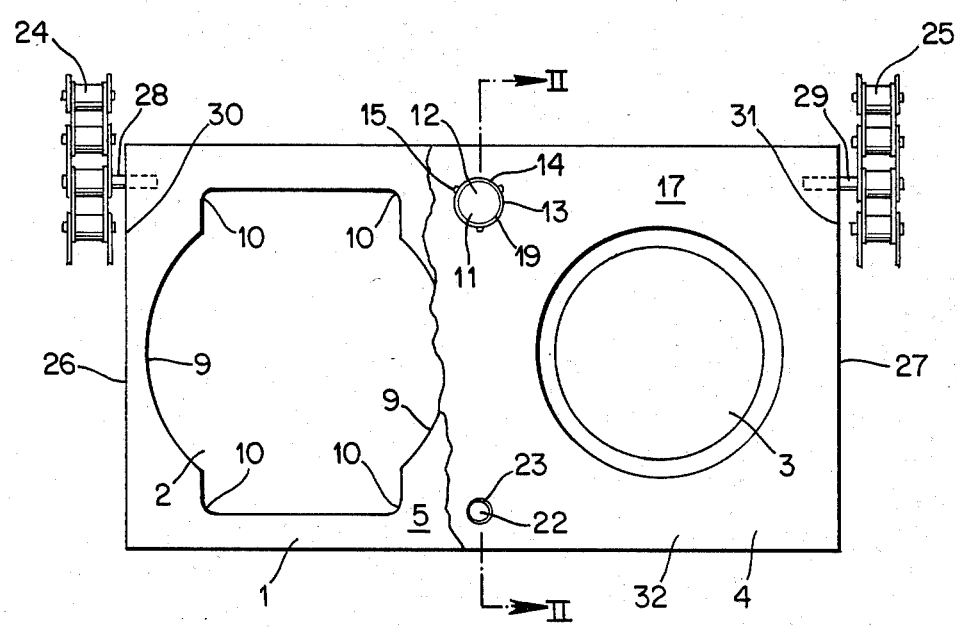
FIG. 1 is a fragmentary plan view of a transporting apparatus which embodies one form of the present invention and wherein the transporting unit comprises two endless chains which are mounted in parallel vertical planes.
Figure 2:
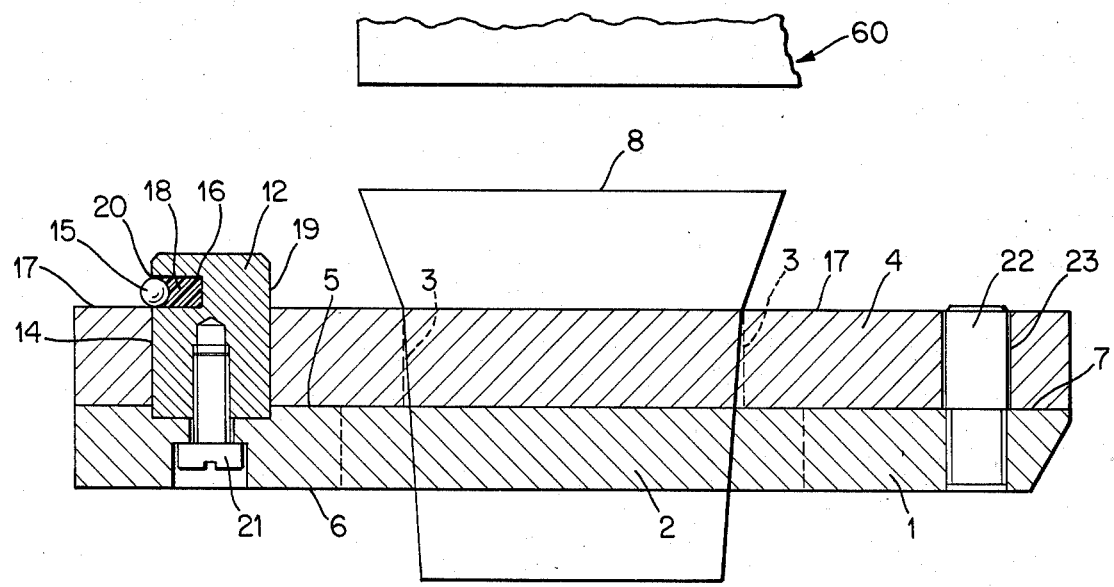
FIG. 2 is an enlarged fragmentary vertical sectional view as seen in the direction of arrows from the line II—II of FIG. 1.

Referring first to FIGS. 1 and 2, there is shown an apparatus which is used to transport a succession of receptacles 8 along a predetermined path at a level below at least one filling unit 60 (a portion of such filling unit is shown in the upper part of FIG. 2 above the open top of the illustrated receptacle). The transporting unit of the improved apparatus comprises two endless chain conveyors 24, 25 which are disposed in two parallel vertical planes at the opposite sides of a set of equidistant substantially plate-like components 1 each of which constitutes a supporting means for a discrete plate-like component 4 constituting a receptacle-locating member. The locating members 4 which are used in the apparatus of FIGS. 1 and 2 are designed to simultaneously locate and orient two receptacles 8 of a particular type. The locating members 4 together constitute a second unit of the improved apparatus, and the apparatus is furnished with two or more sets of locating members 4, one set for each type of receptacles 8 which are to be treated in the machine embodying the improved transporting apparatus. For example, the receptacles of different types can differ from each other only in the dimensions of their material-receiving portions. However, it is also possible to utilize the improved apparatus for the transport of differently dimensioned and/or configurated receptacles. Each receptacle can have a substantially circular cross-sectional outline or each receptacle can constitute a body having a rectangular, square or other polygonal cross-sectional outline.

The supporting plate 1 which is shown in FIGS. 1 and 2 is provided with two apertures 2 each of which has a part circular and part rectangular cross-sectional outline. The area of the illustrated aperture 2 at least matches the cross-sectional area of that portion of the largest receptacle 8 to be treated in the improved apparatus, i.e., of the largest receptacle which is to be filled during travel at a level below the unit 60 of FIG. 2. Furthermore, the configuration of the surface 9 bounding the illustrated aperture 2 is such that the supporting plate 1 can adequately contact and orient a rectangular (see the corners 10), square, circular or similarly configurated receptacle. However, actual contact between the surface 9 in an aperture 2 of the supporting plate 1 and the adjacent portion of a properly supported and oriented receptacle 8 is not necessary because each locating member 4 is formed with two circular sockets 3 which are in the form of cylindrical or otherwise configurated through bores or holes. The locating member 4 of FIGS. 1 and 2 has a pair of cylindrical sockets 3 having constant diameters all the way between the upper side 17 and the underside 7 of the member 4. Consequently, if the lower part of the receptacle 8 has a substantially frustoconical outline (see FIG. 2), the properly inserted receptacle will be held in a mere linear contact with the surface bounding the respective socket 3.

Each supporting plate 1 and each locating member 4 can be made of a suitable metallic material. However, it is equally within the purview of the invention to employ supporting plates and/or locating members which are made of a synthetic plastic or other suitable material. The supporting plate 1 which is shown in FIGS. 1 and 2 is a flat body having parallel sides or surfaces 5 and 6 which are located in a horizontal plane during travel of the corresponding supporting plate along the upper reaches of the chain conveyors 24 and 25, namely during travel of receptacles 8 at a level below the filling unit 60 of FIG. 2. The underside 7 of the illustrated locating member 4 is also flat and is in full surface-to-surface abutment with the upper side 5 of the supporting plate 1. Each of the sockets 3 in a selected locating member 4 is in full register with the corresponding aperture 2 of the adjacent supporting plate 1. The corners 10 in the apertures 2 can be omitted if the apparatus of FIGS. 1 and 2 is designed to transport only receptacles having a circular cross-sectional outline.

In accordance with a feature of the invention, each locating member 4 is separably secured to the corresponding supporting plate 1 by at least one quick-release coupling 11. The details of one such coupling are shown in the left-hand portion of FIG. 2. It will be understood, however, that each locating member 4 can be separably coupled to the corresponding supporting plate 1 by two or more discrete quick-release couplings 11 or analogous couplings.

The illustrated coupling 11 comprises a projection 12 which is a cylindrical stud or pin extending into a shallow recess in the upper side 5 of the supporting plate 1 and through and beyond a complementary opening 14 in the selected locating member 4. A portion (19) of the projection 12 extends upwardly beyond the upper side 17 of the locating member 4 which is shown in FIG. 2. This portion of the projection 12 is formed with a blind bore or with a similar recess 16 whose axis extends at right angles to the axis of the projection 12. The inner portion of the recess 16 receives a block-shaped part 18 which consist of an elastomeric material and serves to bias a spherical detent element 15 in a direction to the left, as viewed in FIG. 2, so that a portion of the detent element 15 extends beyond the outline of the projection 12. The outwardly extending portion of the spherical detent element 15 engages the adjacent portion of the upper side 17 of the selected locating member 4 to thus hold the underside 7 of the member 4 in full contact with the upper side 5 of the supporting plate 1. The open end of the recess 16 is surrounded by an annular internal surface 20 having a diameter which is slightly less than the diameter of the spherical detent element 15 so that the latter cannot be fully expelled from the recess 16 but is rather held in the illustrated position under the bias of the elastomeric part 18. The means for separably securing the projection 12 to the supporting plate 1 comprises a screw 21 whose head is recessed into the underside 6 of the supporting plate 1.

The apparatus preferably further comprises means for properly centering each locating member 4 with reference to the corresponding supporting plate 1. The centering device which is shown in FIGS. 1 and 2 comprises a cylindrical protuberance 22 which is anchored in the supporting plate 1 and extends upwardly beyond the upper side 5 when the supporting plate is located below the filling unit 60. The exposed portion of the protuberance 22 extends into a complementary hole 23 of the locating member 4 so that the protuberance 22 cooperates with the projection 12 in ensuring that the selected locating member 4 is properly oriented with reference to the corresponding supporting plate 1, namely that each socket 3 of such selected locating member is in adequate registry with the corresponding aperture 2.

In the embodiment which is shown in FIGS. 1 and 2, the axes of the projection 12 and protuberance 22 are located in a common vertical plane which is disposed midway between the planes of the chain conveyors 24 and 25. The leading end of each supporting plate 1 (as seen in the direction of travel of plates 1 along the endless path which is defined by the chain conveyors) is separably attached to the adjacent links of the conveyors 24 and 25 by studs 28 and 29. Such studs are recessed into the lateral surfaces 26 and 27 of the corresponding supporting plate 1. The reference characters 30 and 31 respectively denote the corresponding portions of the front end of the supporting plate 1 whose trailing end is denoted by the character 32.

The projection 12 and/or the protuberance 22 is secured to the locating member 4 if the opening 14 and/or the hole 23 is provided in the supporting plate 1.

An important advantage of the improved apparatus is that the selected set of locating members 4 can be rapidly replaced with a different set if the apparatus is to fill and/or otherwise treat differently configured and/or dimensioned receptacles 8. All that is necessary is to depress the spherical detent element 15 against the opposition of the elastomeric part 18 in the corresponding recess 16 so that the locating member 4 can be lifted above and away from the corresponding supporting plate 1. A different locating member 4 (namely a locating member having a differently dimensioned and/or configured socket 3 or a set of two or more differently dimensioned and/or configured sockets) can be placed onto the supporting plate 1 and secured thereto by the simple expedient of ensuring that the protuberance 22 enters the hole 23 of the newly selected locating member and that the projection 12 is received in the corresponding opening 14 to such an extent that the underside 7 of the newly selected locating member abuts against the upper side 5 of the supporting plate 1. This terminates the replacement of the illustrated locating member 4 with a locating member that belongs to a different set.

Each spherical element 15 can be made of a synthetic thermoplastic material. The reference character 13 denotes in FIG. 1 the detent means including the detent element 15, the elastomeric biasing part 18 and the surface 20 at the open end of the recess 16 in the projection 12. The axial length of the end portion 19 of the projection 12 (at a level above the upper side 17 of the locating member 4) can be in the range of a few millimeters, for example, 1.5 mm. The extent to which the detent element 15 projects beyond the outline of the portion 19 of the projection 12 of FIG. 2 can be in the range of a few millimeters, for example, approximately 1.5 mm.

The dimensions of each locating member 4 can match or approximate the dimensions of the corresponding supporting plate 1, i.e., the marginal portions of the supporting plate 1 need not extend laterally beyond the marginal portions of the selected locating member 4 and vice versa. The illustrated supporting plate 1 has a substantially rectangular outline. However, it is equally possible to employ supporting plates and locating members having a square, oval, rectangular or other polygonal outline. The supporting plate 1 of FIG. 1 is elongated transversely of the direction of forward movement with the chain conveyors 24, 25. It is also possible to employ supporting plates which are elongated in the direction of movement and each of which can be provided with two or more apertures 2 which are located one behind the other, as considered in the direction of travel of the chain conveyors. All such modifications will be readily appreciated by those skilled in the art without further illustration. The sprockets which carry and drive the chain conveyors 24 and 25 are not specifically shown in the drawing. Furthermore the drawing does not show the prime mover which drives the conveyors 24, 25. Such prime mover preferably operates in synchronism with means for actuating various components of the filling unit 60 so that the latter discharges predetermined quantities of flowable solid, liquid or partially solid and partially liquid material into the receptacle or receptacles 8 which is or are located therebelow. The planes of the supporting plates 1 can be located at a level above the upper reaches of the chain conveyors 24, 25 during travel of supporting plates below the filling unit 60. Such filling unit can be followed by an additional filling unit and/or by a sealing or closing unit of any conventional design.

The separation of previously used locating members from the corresponding supporting plates 1 and the attachment of newly selected locating members 4 to the corresponding plates 1 can be carried out without any tools or with rudimentary tools. Furthermore, the locating members 4 can only be mounted in a predetermined orientation, namely in optimum positions to properly hold the receptacles which are inserted into their sockets 3 so that the receptacles are located at a predetermined distance from the underside of the filling unit 60 during travel with the preferably horizontal elongated upper reaches of the chain conveyors 25.

The apparatus can be furnished with two, three or more different sets of locating members. Furthermore, it is possible to convert a first locating member into a different second locating member by utilizing suitable annular inserts which are installed in the sockets 3 of the locating members 4 on the supporting plates 1. This even further reduces the length of intervals of non-use of the machine during a change of setup.

It is further within the purview of the invention to place each selected locating member against the underside 6 of the corresponding supporting plate 1. Such transporting and locating units can be utilized in certain types of filling and sealing or analogous machines. Still further, the apertures 2 in the supporting plates 1 can be omitted. In such apparatus, a receptacle 8 which is properly inserted into the socket 3 of the corresponding locating member 4 rests on the plane upper side 5 of the corresponding supporting plate 1 during travel below the filling unit 60. Apparatus having supporting plates without apertures can be utilized with advantage when the receptacles 8 are relatively low so that they can be adequately centered and oriented by extending only into the corresponding sockets 3 and by resting directly on the upper side 5 of the corresponding supporting plate 1.

Figure 3:
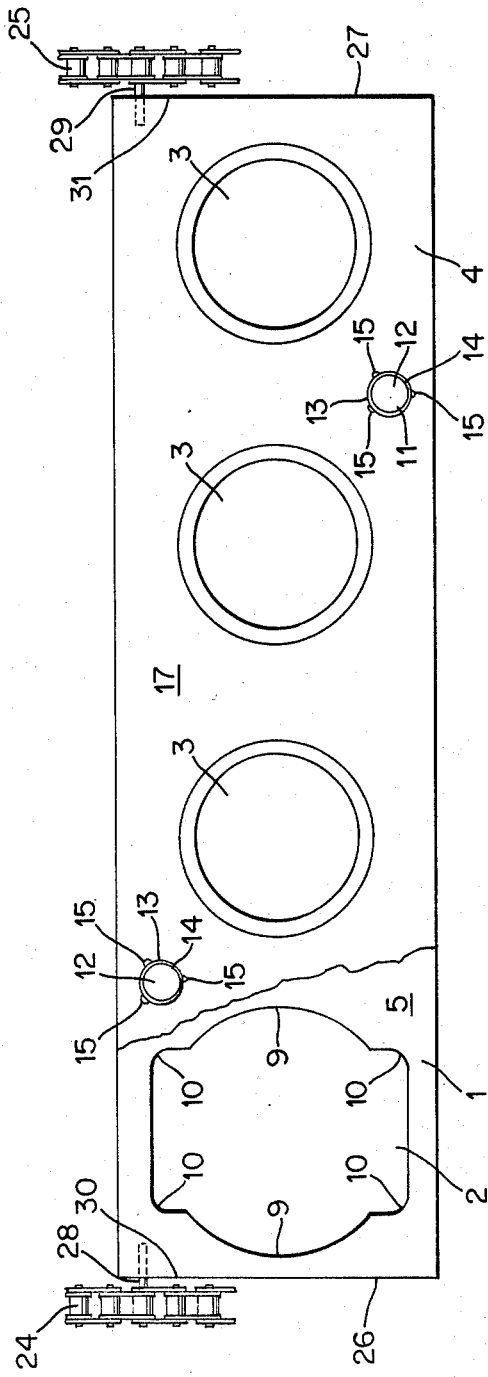
FIG. 3 is a fragmentary plan view of a modified apparatus wherein each supporting means is designed to carry a locating member for four receptacles.

FIG. 3 illustrates a portion of a modified apparatus wherein each supporting plate 1 has four equidistant apertures 2 forming a row which extends transversely of the vertical planes of the chain conveyors 24 and 25. Each such supporting plate 1 carries a discrete locating member 4 which is an elongated rectangular plate-like component resting on the upper side 5 of the associated plate 1 and having a row of four equidistant circular sockets 3 each of which registers with one of the apertures 2. Each socket 3 is or can be bounded by a substantially frustoconical surface. The locating member 4 of FIG. 3 is coupled to and is centered on the associated supporting plate 1 by two quick-release couplings 11 each of which can be designed in the same way as described in connection with FIG. 2. Thus, each of the couplings 11 can be provided with a projection 12 and a detent means 13 including one or more spherical elements 15. FIGS. 1 and 3 show that each coupling 11 can comprise several spherical detent elements 15, for example, a group of three spherical detent elements which are equidistant from each other, as considered in the circumferential direction of the respective projection 12. One of the quick-release couplings 11 which are shown in FIG. 3 replaces the centering device 22, 23 of FIG. 2. However, it is equally possible to secure each locating member of the type shown in FIG. 3 to the corresponding supporting plate 1 by one or more quick-release couplings 11 (or analogous couplings) and one or more centering devices of the type shown in FIG. 2.

The filling unit (not shown) which is used in conjunction with the transporting apparatus of FIG. 3 is designed to simultaneously admit flowable material into a row of four equidistant receptacles 8 during travel of such receptacles between the upper reaches of the chain conveyors 24 and 25. The manner in which the conveyors 24, 25 are coupled with the portions 30 and 31 of the leader or front portion of the supporting plate 1 is the same as described in connection with FIG. 2. The reference characters 26 and 27 again denote those lateral surfaces of the supporting plate 1 which are respectively adjacent to the conveyors 24 and 25.

If the apparatus comprises supporting plates 1 and locating members 4 which are separably coupled to each other by two or more discrete couplings 11 or analogous quick-release couplings, such couplings are preferably uniformly distributed in the space between the chain conveyors 24 and 25 so as to ensure uniform distribution of forces which are applied by the selected locating members when the apparatus is in use. Uniform distribution of quick-release couplings transversely of and/or in the direction of movement of the supporting plates is desirable and advantageous on the additional ground that it ensures more reliable attachment of selected locating members to the corresponding supporting plates. The force with which the detent means 13 retain the selected locating members 4 in abutment with the corresponding supporting plates 1 should be sufficient to prevent accidental separation of locating members while they are located below the corresponding supporting plates, i.e., during travel with the lower reaches of the conveyors 24 and 25.

Figure 4:
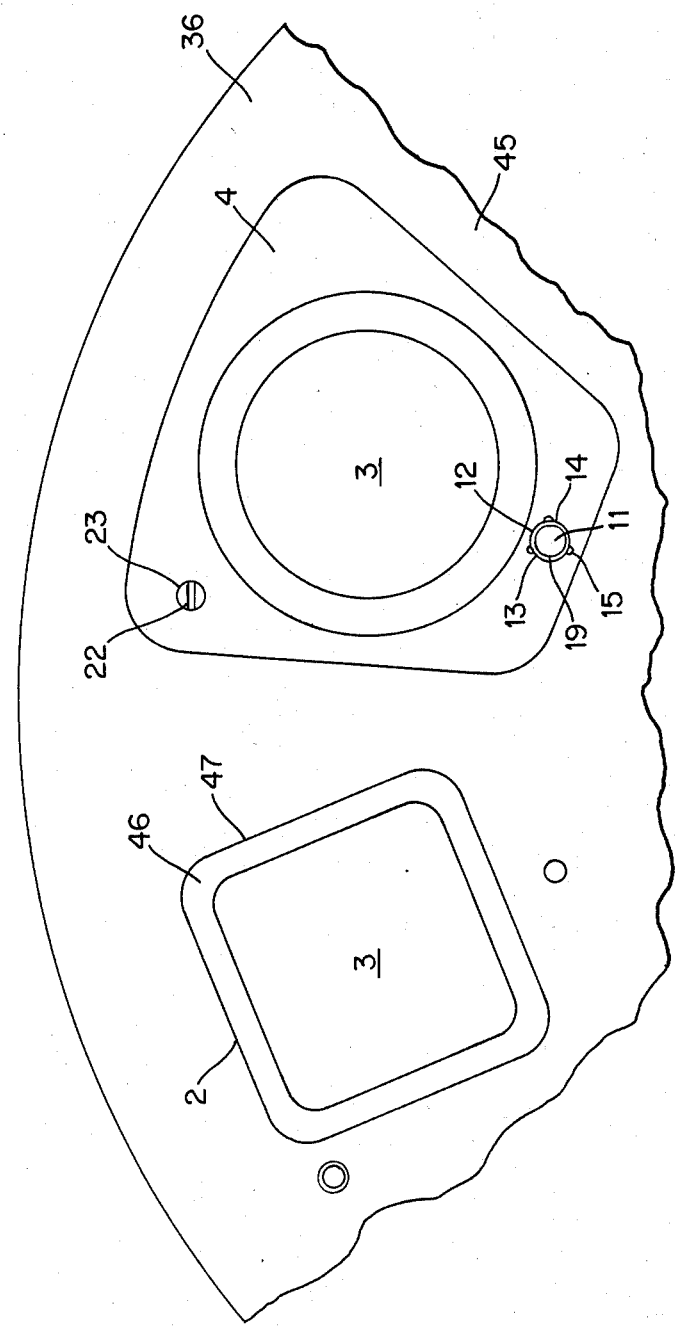
FIG. 4 is a fragmentary plan view of a third apparatus wherein the supporting means comprises or constitutes a turntable which is designed to carry a full set of selected (identical or differently configured) receptacle locating members.

FIG. 4 shows a portion of a modified transporting apparatus wherein the transporting unit is constituted by a single supporting means 36 in the form of a turntable which is indexible or which is continuously rotatable about a vertical axis extending at right angles to the plane of FIG. 4. The turntable 36 is formed with a plurality of apertures 2, one for each of a full set of locating members 4 or 46. The apparatus of FIG. 4 exhibits the advantage that it need not employ one or more endless chains, belts or similar conveyors. The turntable 36 constitutes a conveyor which can transport the selected set of locating members 4 or 46 along an endless circular path in such distribution that the selected locating members 4 or 46 are equidistant from the vertical axis of the turntable as well as from each other, as considered in the circumferential direction of the turntable.

The right-hand locating member 4 of FIG. 4 is similar to the locating member 4 of FIGS. 1 and 2. The major difference between the locating members 4 of FIGS. 2 and 4 is that the locating member 4 of FIG. 4 does not have a square or rectangular outline and also that the dimensions of the locating member are a fraction of the dimensions of the turntable (supporting plate) 36. The locating member 4 is secured to the upper side 45 of the turntable 36 by a quick-release coupling 11 and by a centering device including a protuberance 22 extending into a complementary hole 23 of the locating member 4. The turntable 36 is not formed with apertures 2 if it is to support only locating members 4 having differently dimensioned sockets 3. The receptacles 8 (not shown in FIG. 4) which are to extend into the sockets 3 of locating members 4 of the type shown in the right-hand portion of FIG. 4 simply rest on the upper side 45 of the turntable 36. The filling unit (not shown) is located at a level above the path for the receptacles in the locating members 4 which are releasably coupled to the turntable 36.

The left-hand portion of FIG. 4 shows a locating member 46 which is an annular insert having a peripheral surface 47 which can be fitted into the aperture 2 of the turntable 36. This locating member 46 constitutes one of a set of, for example, eight or more locating members or inserts which can be used to accommodate portions of square or rectangular receptacles (note the outline of the socket 3 in the locating member 46). An avantage of such simple locating members 46 is that they need not be secured to the turntable 36 by quick-release couplings, centering devices and the like because proper orientation of each locating member 46 is ensured in response to insertion into the corresponding aperture 2. Of course, each locating member 46 can be provided with one or more laterally extending lugs (not specifically shown) which overlie the upper side 45 of the turntable 36 and are separably secured to the turntable by screws, quick-release couplings or the like, not shown. It is further clear that the illustrated square frame-like locating member or insert 46 can be replaced with a substantially circular locating member, depending on the configuration of the surface which bounds the respective aperture 2 and on the configuration of the socket 3 in such locating member. For example, the locating member 46 which is shown in the left-hand portion of FIG. 4 can be replaced with a locating member which has a circular socket 3 for a correspondingly configured receptacle.

The apparatus of FIG. 4 can be modified in a number of additional ways. For example, the solid plate-like turntable 36 can be replaced with a skeleton frame consisting of a hub and radially outwardly extending spokes connected to a circumferential rim and serving to releasably and separably support a selected set of locating members 4 or 46. The spokes of the just discussed skeleton frame can be made of profiled or flat steel stock.

Figure 5:
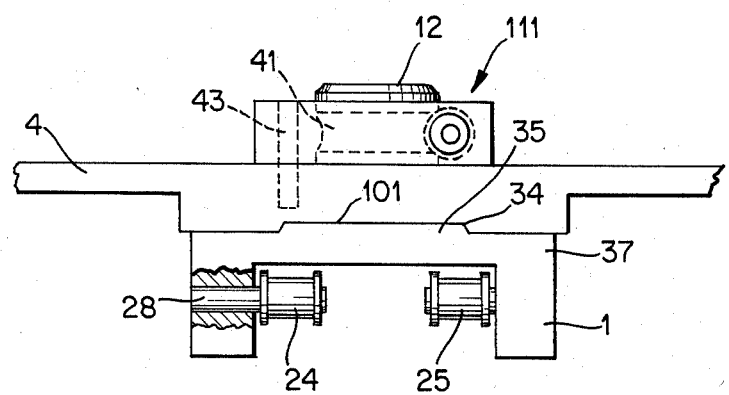
FIG. 5 is a fragmentary transverse vertical sectional view of a fourth apparatus wherein the underside of each locating member is formed with a groove receiving a tongue at the upper side of the corresponding supporting means.
Figure 6:
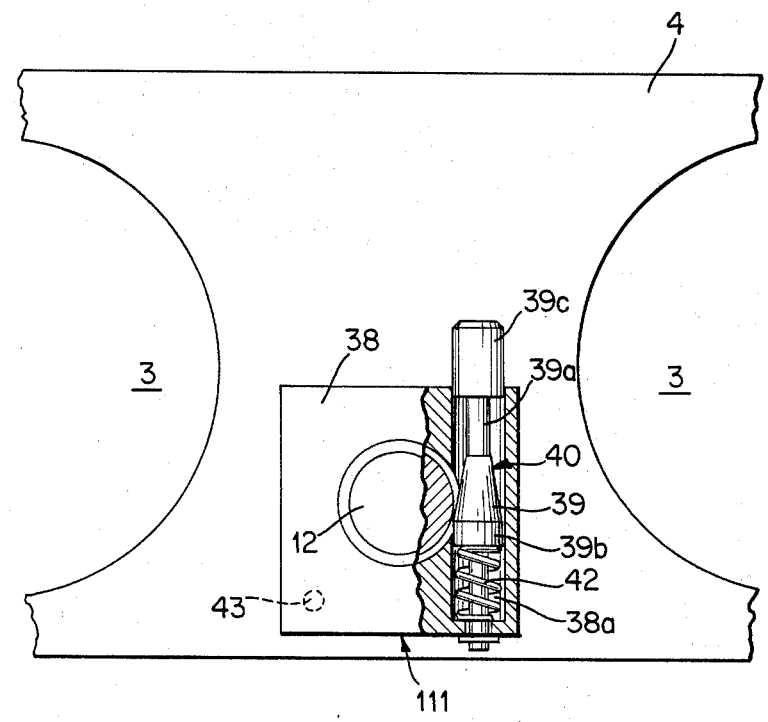
FIG. 6 is an enlarged fragmentary partly horizontal sectional view of the apparatus which is shown in FIG. 5.

FIGS. 5 and 6 show a portion of a further apparatus wherein the illustrated supporting plate 1 has two downwardly extending legs 37 flanking the adjacent endless chain conveyors 24 and 25. The illustrated supporting plate 1 has a substantially U-shaped outline with a web which extends between the legs 37, which overlies the adjacent portions of the chain conveyors 24, 25, and which has a dovetailed or otherwise configurated orienting or aligning tongue 35 received in a complementary groove 34 in the adjacent side or surface of the selected locating member 4. The web of the U-shaped supporting plate 1 need not be provided with an aperture, i.e., the bottom of a receptacle which is received in a socket 3 of the adjacent locating member 4 can rest directly on the surface 101 of the tongue 35.

The means 111 for releasably coupling the supporting plate 1 of FIGS. 5 and 6 to the selected locating member 4 departs from the quick-release coupling 13 of FIG. 2. The projection 12 of the plate 1 is similar to the projection 12 of FIG. 2 except that it is provided with a circumferentially extending groove 41 for a conical portion 39 of a detent element 40 which further includes a smaller-diameter portion 39a at the smaller-diameter end of the conical portion 39 and a cylindrical portion 39b at the larger-diameter end of the portion 39. The major part of the detent element 40 is received in a blind bore or recess 38a of an annular member 38 which surrounds the major part of the projection 12 and abuts against the upper side of the selected locating member 4. A centering protuberance 43 of the annular member 38 extends into a complementary blind bore of the locating member 4. The outwardly extending tip 39c of the detent element 40 can be depressed against the opposition of a coil spring 42 which is installed in the deepmost portion of the recess 38a so that the conical portion 39 can be expelled from the groove 41 whereby the annular member 38 can be lifted off the locating member 4 and the latter can be lifted off the web of the supporting plate 1. The centering protuberance 43 ensures that the annular member 38 cannot turn about the axis of the projection 12 when the locating member 4 is coupled to the adjacent supporting plate 1. However, the protuberance 43 is optional, especially if the annular member 38 is relatively small so that it cannot extend into engagement with a receptacle which is received in one of the adjacent sockets 3 of the locating member 4.

The tongue 34 and groove 35 of FIG. 5 can replace the quick-release coupling of FIGS. 1 and 2 or the coupling of FIGS. 5–6. The width of the groove 34 can vary at right angles to the direction of transport of the supporting plate 1 so that the tongue 35 can be wedged therein in order to ensure proper retention of the locating member 4 in a predetermined position with reference to the web of the plate 1. If desired, the tongue 35 and groove 34 can extend transversely of the planes of the chain conveyors 24 and 25. This depends on the availability of space adjacent to the conveyors 24, 25 and on the mutual spacing of successive supporting plates 1 on the chain conveyors. A dovetailed tongue 35 can properly hold the selected member 4 without any coupling (such as 11 or 111).

Since the supporting plate 1 of FIGS. 5 and 6 does not have any apertures, it merely serves as a support or abutment for the underside of the receptacle or receptacles in the socket or sockets 3 of the corresponding (selected) locating member 4.

The provision of dovetailed or otherwise configurated tongues 35 and correspondingly configurated grooves 34 on the supporting plates 1 and selected locating members 4 is particularly desirable if the locating members are to reliably carry receptacles or the like during travel at a level below the associated supporting plates. Furthermore, couplings in the form of tongues and grooves can also be utilized in conjunction with otherwise configurated quick-release couplings, such as the coupling 11 of FIG. 2.

An important advantage of the improved apparatus is that the receptacles need not be held only by supporting plates or that the receptacles need not be held by supporting plates at all. This renders it possible to utilize a single set of supporting plates in combination with two or more sets of different locating members each of which is designed to support one or more receptacles having a predetermined size and/or shape. In other words, the transporting unit including the supporting plate or plates and one or more conveyors or the turntable 36 need not be dismantled when the machine utilizing the improved apparatus is to be converted for the filling or other treatment of different types of receptacles. All that is necessary is to replace a previously used locating member or a previously used set of locating members with a different locating member or with a different set of locating members. The replacement of one set of locating members with a different set of locating members takes up a small fraction of the time which is required to change the setup in a conventional transporting apparatus. The utilization of quick-release couplings of the type shown in FIG. 2 or 6 renders it possible to further reduce the time which is required to replace a previously used set of locating members with a different set and to simultaneously ensure that each locating member is properly oriented relative to the associated supporting plate.

If the locating members are to be mounted at the undersides of the respective supporting plates or at the underside of a turntable, the supporting plates or the turntable can be provided with apertures for those portions of the locating members which are to confine parts of receptacles. Thus, the receptacles then simply extend through the supporting plates or through the turntable and into the sockets of the locating members below the supporting plates or turntable.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for transporting different types of receptacles, particularly in a filling machine, comprising a transporting unit defining a predetermined path; a second unit including several receptacle-locating members, at least one for each type of receptacle, said transporting unit having means for supporting at least one selected locating member so that receptacles of the corresponding type can be inserted into the selected locating member on said transporting unit and can be advanced along said predetermined path, each of said locating members having at least one socket with an outline complementary to that of the receptacles of the corresponding type so that at least a portion of a receptacle can be inserted into such socket when the corresponding locating member is mounted on said transporting unit; and at least one quick-release coupling for separably securing the selected locating member to said supporting means, comprising a projection which is provided on said supporting means and is receivable in a complementary opening of the selected locating member, and detent means for releasably holding said projection in the opening of the selected locating member, said projection having a transversely extending recess and said detent means comprising a substantially spherical detent element received in said recess and means for biasing said detent element outwardly so that the detent element normally extends beyond the outline of said projection and can engage the selected locating member whose opening receives said projection.

2. The apparatus of claim 1, wherein said supporting means comprises a first substantially plate-like component and each of said locating members comprises a second substantially plate-like component.

3. The apparatus of claim 2, wherein the selected locating member is parallel to said supporting means.

4. The apparatus of claim 1, wherein said supporting means has a substantially plane upper side and the selected locating member rests on the upper side of said supporting means.

5. The apparatus of claim 1, wherein said biasing means comprises a block-shaped part of elastomeric material, said part being disposed in said recess inwardly of said detent element.

6. The apparatus of claim 1, wherein said recess is a bore having an open end and said projection has an annular internal surface surrounding said open end and having a diameter less than the diameter of said detent element so that the latter cannot be fully expelled from said bore.

7. The apparatus of claim 1, wherein said projection is separable from said supporting means and further comprising means for separably securing said projection to said supporting means.

8. The apparatus of claim 1, further comprising at least one centering device provided on said supporting means and engaging with the selected locating member.

9. The apparatus of claim 8, wherein said centering device comprises a protuberance provided on said supporting means and extending into a complementary hole in the selected locating member.

10. The apparatus of claim 1, wherein said transporting unit further comprises at least one endless conveyor and means for attaching said supporting means to said conveyor.

11. The apparatus of claim 10, wherein said conveyor has an elongated reach and said supporting means is located at a level above said reach in the corresponding portion of said path, and further comprising means for filling the receptacle in the selected locating member, said filling means being disposed at a level above said reach.

* * * * *